United States Patent
Nadeau et al.

(10) Patent No.: US 6,280,779 B1
(45) Date of Patent: Aug. 28, 2001

(54) PET FOOD FOR MAINTAINING NORMAL BOWEL HEALTH

(75) Inventors: Douglas Brian Nadeau; Michelle Lynn Jackson; Gary Allan Semjenow, all of Topeka, KS (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 09/473,543

(22) Filed: Dec. 28, 1999

(51) Int. Cl.⁷ .................. A23K 1/10; A23K 1/18
(52) U.S. Cl. .............. 426/2; 426/577; 426/578; 426/573; 426/805
(58) Field of Search ............... 426/2, 577, 578, 426/573, 805

(56) References Cited

U.S. PATENT DOCUMENTS

| | | | |
|---|---|---|---|
| 4,276,311 | * 6/1981 | Burrows et al. | 426/56 |
| 4,427,704 | * 1/1984 | Cheney et al. | 426/104 |
| 4,478,868 | * 10/1984 | Ariss et al. | 426/641 |
| 4,791,002 | 12/1988 | Baker et al. | 426/641 |
| 4,822,626 | * 4/1989 | Spanier et al. | 426/94 |

FOREIGN PATENT DOCUMENTS

| | | | |
|---|---|---|---|
| 0121813A1 | 10/1984 | (EP) | A23K/1/18 |
| 0185511A2 | 6/1986 | (EP) | A23L/1/04 |
| 1537209 | 12/1978 | (GB) | A23K/1/04 |
| WO 97/42834 | 11/1997 | (WO) | A23J/1/16 |

OTHER PUBLICATIONS

Effect of various diets on faecal analysis in normal dogs; P.J. Canfield, A.J. Fairburn, D.B. Church; *Research in Veterinary Science*; vol. 34, No. 1, 1983; pp. 24–27.

Digestibility and Compatibility of Mixed Diets and Faecal Consistency in Different Breeds of Dog; H. Meyer, J. Zentek, H. Habelnoll and I. Maskell; *Journal of Veterinary Medicine*, Series A –Zentralblatt Fuer Verterinaermedizin; vol. 46, No. 3., 1999; pp. 155–165.

* cited by examiner

Primary Examiner—Chhaya D. Sayala
(74) Attorney, Agent, or Firm—Martin B. Barancik

(57) ABSTRACT

A pet food composition comprising meat chunk and gravy, said gravy having chemically modified starch, gum, or mixtures thereof, in quantities less than that necessary to promote the production of stool quality that is unacceptable.

5 Claims, No Drawings

PET FOOD FOR MAINTAINING NORMAL BOWEL HEALTH

BACKGROUND OF THE INVENTION

Canned pet foods of the meat chunk and gravy type have been in the marketplace for years. They can be used as a total diet for pets or as a supplement to a pet's daily rations. Generally, the chunks are pieces of meat or meat by-products which are formed. This is the primary content of the chunk. Also present in the chunk are usually grains and fibrous materials as well as vitamins and nutrients. These materials are generally present as the minor portion of the chunk. The gravy portion usually has a fluid characteristic and supplies aroma, palatability, and some additional nutritional properties to the food product such as additional vitamins, minerals, and the like. Also present in the market place are other discrete meaty forms in a discrete separate gravy product. These forms are sometimes known as "slices", that is where the discrete meat portion is somewhat elongated, as relatively flat as in a delicatessen sliced meat. As utilized throughout this specification and claims the term "chunk" shall include slices as well as any other discrete meat containing composition which is separate from the discrete gravy component of the diet. In each of these cases, the "chunks" are present with the gravy as a single unit, for example, sold in a container.

We have recently noted that the usage of meat chunk and gravy diets for animals, particularly canines, have a specific problem. In all of the canines tested with various marketed meat chunk and gravy diets as the sole diet for the canine, the animals encountered significant irregularity in fecal discharge. This is manifested by the appearance of loose, watery stools, or straight diarrhea when the animal defecates.

After a significant study, we have discovered the cause of this problem and a manner in which to essentially eliminate or substantially reduce the problem. This solution lies in the elimination or substantial reduction of certain materials utilized in the gravy portion of the diet, specifically, chemically modified starch(es), gum(s), and mixtures thereof.

SUMMARY OF THE INVENTION

In accordance with the invention, there is a pet food composition comprising meat chunk and gravy, said gravy having chemically modified starch, gum, or mixtures thereof in quantities less than that necessary to promote the production of stool quality which is unacceptable.

A further aspect of the invention is a method for inhibiting the production of unacceptable stool quality in pets fed at least primarily a chunk and gravy diet which comprises feeding the pet a chunk and gravy diet wherein the gravy has a chemically modified starch, gum, or mixtures thereof, in quantities below that necessary to promote production of stool quality which is unacceptable.

DESCRIPTION OF THE PREFERRED EMBODIMENTS

Included within the term meat are those meat-derived ingredients defined as "meat" and "meat by-products" by the current Definitions of Feed Ingredients published by the Association of American Feed Control Officials, Incorporated. As defined, the term "meat" includes not only the flesh of cattle, swine, sheep and goats, but also other mammals, poultry and fish. The term "meat by-products" is defined to include non-rendered parts of the carcass of slaughtered animals, poultry and the like. Preferred meat sources include lamb, pork, chicken, and the like. Meat includes the striated muscle. Meat by-products include liver, spleen, heart, and lung. Meat and meat by-products comprise about 60 to about 85% of the meat chunk component of the meat chunk and gravy food product. The remainder of the meat chunk generally comprises grains, fibrous materials, vitamins, and the like. Some of these are effective binding agents for the meat chunk as well. Wheat flour, dry blood plasma and dried egg are effective binding agents for the meat derived ingredients from which the meat chunks are manufactured. Preferred meat chunk formulations will contain from about 4 to 8% by weight wheat flour, from 0.5 to about 7% by weight dry blood plasma and about 2 to about 4% dried egg. Vitamins and minerals can also be added.

In addition to these ingredients, various minor ingredients such as nutritional supplements, salts, coloring agents, and the like, are also included in the meat chunk formulation to provide nutritional balance and palatability.

The gravy component is prepared for canning with the meat pieces. The gravy component typically comprises water and thickening agents. We have found that thickeners commonly employed in the gravy component of a meat chunk and gravy diet for pets, particularly those directed to canines, are responsible for loose stools or diarrhea usually observed in these animals, particularly canines, when fed a diet principally or solely of meat chunk and gravy. These thickeners are chemically modified starch(es), gum(s) and mixtures thereof. Examples of chemically modified starches include starches from corn, wheat, rice, potato, tapioca and the like which are modified by any or a mixture of acylation such as acetylation, cross-linking from groups such as phosphate, hydroxyalkyl such as hydroxypropyl. Examples of gums include xanthan, guar, locust bean, carboxymethylcellulose, and the like. It is most desirable to not use any of these thickening agents. However, any amount of these thickening agents which does not promote the production of stool quality which is unacceptable from the concept of formed versus watery can be employed. Generally, less than about 0.2 wt % of the diet of these thickeners can be present.

Desirably, less than about 0.1 wt % of the diet should be present. Most desirable is the absence of these thickeners.

Materials which can be employed to thicken the gravy, liquid component of the meat chunk and gravy diet are standard, chemically unmodified starches available from various food sources including wheat, corn, rice, potato, tapioca, and the like. These materials are used in quantities to assist in bringing about the desired gravy thickness and consistency. Generally, this is about 1.5 to about 3 wt % of the diet. The preferred starch is a physically modified, waxy rice starch.

Other ingredients, which may be included in the gravy component, are soluble carbohydrates such as maltodextrin, sucrose and corn syrup, as well as also salts, color, flavors and emulsifiers such as lecithin. Desirably, a mixture of from about 1 to about 5% by weight of the chemically unmodified starch, from 0 to about 12% by weight maltodextrin and about 70 to about 95% by weight water are blended at 60 to 195° F. to provide a thickened gravy which is applied to the meat pieces immediately after the meat pieces have been placed into the can before sealing and sterilizing.

The meat chunk component is prepared by first grinding frozen meat under controlled conditions to prevent the temperature of the meat from rising above 38° F. The meat is ground to a relatively fine grind by passing broken frozen blocks of the meat through a grinder where the meat is sized to particles between ⅛ and ½ inch. The comminuted, sized particles are fed to a meat emulsion blender where the meat particles are blended with oat fiber, when employed, binders such as plasma, wheat flour and dry egg, nutrients, minerals and salts to form a meat mixture. The oat fiber is added generally in the form of particles, which desirably pass through a sieve of about 200 microns. The meat mixture is then heated to raise the temperature of the meat mixture to between about 32° and 40° F. whereupon the mixture is emulsified and vacuum deaerated, to remove entrained air at 25–30 inches mercury.

A meat emulsifier is used to reduce the particle size of the mixture ingredients and create a fine, homogeneous meat mixture, which will not separate upon further processing. The temperature of the meat mixture during the emulsification step is maintained between about 40° F. and 60° F. and preferably about 40° to 50° F. The so prepared meat emulsion is transferred through an extruder from which it is uniformly deposited, as a sheet or elongated shape, having a thickness of about ¼ to 1 inch, onto a moving cooking belt of the desired dimensions. The cooking belt with the meat emulsion deposit is passed through a cooker and cooked to an internal meat temperature of about 175° to 200° F. for about 2 to 9 minutes to fully cook the meat mixture and then cooled to between about 140° to 180° F. to develop the desired texture. At this point the meat is divided or cut to the desired chunk dimensions generally about ½×½ inches.

The gravy in which the meat chunks are to be packaged is prepared separately from the meat pieces. After preparation, the gravy is heated in accordance with the following preferred sequence: about 190° F. for 15 minutes, about 195° F. for 10 minutes and 200° F. for 7 minutes. Thereafter, the gravy can either be cooled or left at the cooking temperature until it is blended with the meat chunks and then deposited into the cans. The cans containing meat and gravy are sealed and sterilized according to commercial sterilization requirements.

The invention is further illustrated by the following specific, but non-limiting Examples.

EXAMPLE I

MEAT CHUNK-IN-GRAVY PET FOOD COMPOSITIONS

A series of meat chunk-in-gravy pet foods designated Pet Food X, Y and Z were prepared following the procedure previously described using the ingredients as listed in Tables I–III.

TABLE 1

Meat-In-Gravy Pet Food X

| INGREDIENTS | % OF MEAT EMULSION | % OF GRAVY | % OF PRODUCT |
|---|---|---|---|
| Meat and Meat By-Product | 76.63 | 0 | 36.10 |
| Fiber and Binding Agent | 19.74 | 0 | 9.30 |
| Vitamins | 0.26 | 0 | 0.12 |
| Minerals | 0.87 | 0 | 0.41 |
| Water | 2.50 | 88.52 | 48.00 |
| Maltodextrin | — | 7.96 | 4.21 |
| Starch | — | 3.01 | 1.59 |
| Lecithin | — | 0.51 | 0.27 |
| Total | 100.00 | 100.00 | 100.00 |

TABLE II

Meat-In-Gravy Pet Food Y

| INGREDIENTS | % OF MEAT EMULSION | % OF GRAVY | % OF PRODUCT |
|---|---|---|---|
| Meat and Meat By-Product | 76.26 | 0 | 35.90 |
| Fiber and binding Agent | 19.75 | 0 | 9.30 |
| Vitamins | 0.26 | 0 | 0.12 |
| Minerals | 1.23 | 0 | 0.58 |
| Water | 2.50 | 88.7 | 48.10 |
| Maltodextrin | — | 7.6 | 4.00 |
| Starch | — | 3.02 | 1.60 |
| Lecithin | — | 0.51 | 0.27 |
| Carmel color | — | 0.17 | 0.09 |
| Total | 100.00 | 100.00 | 99.96 |

TABLE III

Meat-In-Gravy Pet Food Z

| INGREDIENTS | % OF MEAT EMULSION | % OF GRAVY | % OF PRODUCT |
|---|---|---|---|
| Meat and Meat By-Product | 75.34 | 0 | 35.70 |
| Fiber and binding Agent | 20.05 | 0 | 9.50 |
| Vitamins | 0.26 | 0 | 0.12 |
| Minerals | 1.71 | 0 | 0.80 |
| Water | 2.64 | 88.28 | 47.70 |
| Maltodextrin | | 7.83 | 4.12 |
| Starch | — | 3.04 | 1.60 |
| Lecithin | — | 0.51 | 0.27 |
| Carmel color | — | 0.34 | 0.18 |
| Total | 100.00 | 100.00 | 99.99 |

In preparing Pet Foods X, Y and Z, blocks of frozen meat and meat by-products were ground through a grinder equipped with ⅛ inch hole grind plate. The meat ingredients were mixed with dry and liquid ingredients in the amounts listed in Tables I–III. Mixing was performed in a twin ribbon mixer and then emulsified through an emulsifier. The resulting fine emulsion was deaerated using in a Marlen Vacuum Hopper equipped pump. The meat emulsion extruder is equipped with a variable die capable of producing ¼ to 1 inch thick, 12 inch wide emulsion sheet at the rate of 200 lb./hr. The ¾ sheet was passed through a steam tunnel, with a residence time of about 5 minutes. The temperature of uncooked emulsion entering the steam tunnel was between about 40–60° F. and was raised to about 175–195° F. at the steam tunnel discharge. The cooked, firm, solid sheet was sliced into ¾ inch ×¾ inch chunks at 140–180° F. and mixed with cooked gravy and deposited into cans.

The gravy was prepared according to the formula given in Tables I–III and added to the meat chunks in the can. The filled cans were sterilized in a still retort at 252° F. for 75 minutes.

Pet food X is high in chicken, Y is high in lamb, and Z is high in beef.

The compositions of the comparative commercial diets were obtained from the ingredients listed on the labels of the food package and are recorded in Tables IV–VIII below. DMB as used throughout is dry matter basis.

TABLE IV

Diet A
Ingredients: water, chicken, turkey, lamb, meat by-products, wheat gluten, whole rice, corn starched-modified, wheat flour, salt, potassium chloride, tricalcium phosphate, caramel color, sodium tripolyphosphate, natural flavor, minerals, vitamins

| NUTRIENT | LEVEL (%) |
| --- | --- |
| Moisture (as is) | 80.17 |
| Protein (DMB) | 42.21 |
| Crude Fiber (DMB) | 0.50 |
| Crude Fat (DMB) | 24.66 |
| Ash (DMB) | 7.82 |
| Calcium (DMB) | 1.26 |
| Phosphorus (DMB) | 1.01 |
| Magnesium (DMB) | 0.07 |
| Sodium (DMB) | 1.06 |
| Metabolizable Energy (DMB) | 442 Kcal/Kg |

TABLE V

Diet B
Ingredients: water, poultry, beef, meat by-products, wheat flour, wheat gluten, salt, sunflower oil, caramel color, sodium tripolyphosphate, natural flavors, guar gum, sodium alginate, minerals, vitamins, xanthan gum, onion powder, garlic powder

| NUTRIENT | LEVEL (%) |
| --- | --- |
| Moisture (as is) | 81.45 |
| Protein (DMB) | 45.93 |
| Crude Fiber (DMB) | 1.08 |
| Crude Fat (DMB) | 22.26 |
| Ash (DMB) | 10.84 |
| Calcium (DMB) | 1.83 |
| Phosphorus (DMB) | 1.56 |
| Magnesium (DMB) | 0.07 |
| Sodium (DMB) | 1.89 |
| Metabolizable Energy (DMB) | 4196 Kcal/Kg |

TABLE VI

Diet C
Ingredients: water, beef, chicken, liver, meat by-products, food starch-modified, iodized salt, dextrose, guar gum, steamed bone meal, sodium tripolyphosphate, caramel natural flavor, minerals, vitamins

| NUTRIENT | LEVEL (%) |
| --- | --- |
| Moisture (as is) | 79.40 |
| Protein (DMB) | 42.48 |
| Crude Fiber (DMB) | 0.97 |
| Crude Fat (DMB) | 29.90 |
| Ash (DMB) | 11.31 |
| Calcium (DMB) | 1.41 |
| Phosphorus (DMB) | 1.41 |
| Magnesium (DMB) | 0.07 |
| Sodium (DMB) | 2.28 |
| Metabolizable Energy (DMB) | 4563 Kcal/Kg |

TABLE VII

Diet D
Ingredients: water, beef, animal liver, turkey, wheat gluten, chicken, soy flour, corn starch-modified, potassium chloride, caramel color, steamed bone meal, salt, minerals, vitamins, natural flavor

| NUTRIENT | LEVEL (%) |
| --- | --- |
| Moisture (as is) | 78.81 |
| Protein (DMB) | 54.41 |
| Crude Fiber (DMB) | 0.94 |
| Crude Fat (DMB) | 20.81 |
| Ash (DMB) | 7.27 |
| Calcium (DMB) | 1.37 |
| Phosphorus (DMB) | 1.04 |
| Magnesium | 0.10 |
| Sodium (DMB) | 0.39 |
| Metabolizable Energy (DMB) | 4253 Kcal/Kg |

TABLE VIII

Diet E
Ingredients: meat broth, beef, chicken, turkey, meat by-products, wheat flour, wheat gluten, pea fiber, caramel color, salt, sodium tripolyphosphate, guar gum, natural flavors, sodium alignate, potassium chloride, xanthan gum, onion powder, garlic powder, minerals, vitamins

| NUTRIENT | LEVEL (%) |
| --- | --- |
| Moisture (as is) | 79.66 |
| Protein (DMB) | 45.53 |
| Crude Fiber (DMB) | 2.46 |
| Crude Fat (DMB) | 25.12 |
| Ash (DMB) | 11.46 |
| Calcium (DMB) | 2.02 |
| Phosphorus (DMB) | 1.7 |
| Magnesium (DMB) | 0.09 |
| Sodium (DMB) | 1.77 |
| Metabolizable Energy (DMB) | 4269 Kcal/Kg |

In a series of separate seven day feeding tests, ten adult beagle dogs were fed only Pet Foods X, Y, Z. The dogs were allowed 45 minutes to consume the pet food. Two types of feeding were evaluated (a) ad libitum, that is 1200 grams of food offered/day or (b) maintenance whereby the dogs were fed to maintain their optimal body weight. Feces eliminated by each dog were evaluated daily and given a grade based on the observed physical condition of the fecal matter. The grades given were as follows:

Grade 1 Greater than two thirds of the feces in the defecation are liquid. The feces have lost all form, appearing as a puddle or squirt.

Grade 2 Solid-liquid feces are an intermediate between soft and liquid feces. Approximately equal amounts of feces in defecation are soft and liquid.

Grade 3 Greater than two-thirds of the feces in a defecation are soft.

The feces retain enough form to pile but have lost their firm cylindrical appearance.

Grade 4 Firm-soft feces are an intermediate between the grades of firm and soft. Approximately equal amounts of feces in a defecation are firm and soft.

Grade 5 Greater than two-thirds of the feces in a defecation are firm. They have a cylindrical shape with little flattening.

The higher the grade, the less gastrointestinal dysfunction experienced by the animals. Dogs fed food compositions, in which the fecal matter eliminated was graded 3-4-5, were considered suitable for commercial use. Food fed the dogs in which the eliminated fecal matter was graded 1-2 was considered unacceptable for any purpose.

For purposes of comparison, the feeding test procedure of the Example was repeated except the five commercial meat chunk and gravy type pet foods designated "Diets A, B, C, D and E" were evaluated for the condition of the fecal discharge of the test animals.

The results of the feeding studies are rendered in Table IX below:

TABLE IX

| DIET | FEEDING LEVEL | STOOL GRADE FREQUENCIES (%) | | | | |
|---|---|---|---|---|---|---|
| | | 1 | 2 | 3 | 4 | 5 |
| X - Chicken in | Ad libitum | 0 | 9 | 22 | 48 | 22 |
| gravy (3% starch) | Maintenance | 1 | 0 | 7 | 12 | 80 |
| Y - Lamb in gravy | Ad libitum | 5 | 6 | 22 | 35 | 32 |
| (3% starch) | Maintenance | 0 | 0 | 8 | 58 | 34 |
| Z - Beef in grayy | Ad libitum | 1 | 3 | 18 | 33 | 45 |
| (3% starch) | Maintenance | 1 | 1 | 7 | 12 | 79 |
| | Ad libitum | 4 | 9 | 11 | 31 | 46 |
| Diet A | Ad libitum | 14 | 13 | 35 | 32 | 6 |
| | Maintenance | 1 | 14 | 29 | 32 | 24 |
| Diet B | Ad libitum | 5 | 25 | 30 | 24 | 16 |
| Diet C | Ad libitum | 36 | 8 | 21 | 23 | 12 |
| | Maintenance | 21 | 17 | 36 | 16 | 10 |
| Diet D | Ad libitum | 7 | 17 | 24 | 27 | 25 |
| Diet E | Ad libitum | 18 | 18 | 13 | 20 | 31 |

The results recorded in Table IX show that the proposed invention produces significantly better stool quality than the commercially available products of similar meat chunk and gravy form. In general, when the invention diet is fed as the sole source of nutrition, the maintenance level feedings produce superior results than ad libitum, indicating a dosage related effect.

Additionally, other gravy thickening systems were found to produce poor stool quality. A series of thickening systems were tested using a common chunk formula. Table X lists the stool quality rating for each system.

TABLE X

| DIET | FEEDING LEVEL | STOOL GRADE FREQUENCIES (%) | | | | |
|---|---|---|---|---|---|---|
| | | 1 | 2 | 3 | 4 | 5 |
| F - chunks + 0.5% guar gum + 99% water | Ad libitum | 34 | 21 | 18 | 16 | 11 |
| G - chunks + 0.19% Xanthan Gum | Ad libitum | 30 | 45 | 21 | 3 | 1 |
| H - chunks + 0.42% CMC | Ad libitum | 5 | 19 | 32 | 30 | 14 |
| I - chunks + 2.09% HP starch | Ad libitum | 6 | 24 | 27 | 31 | 12 |
| J - chunks + 0.16% CMC + 2.61% P linked potato starch | Ad libitum | 9 | 18 | 32 | 28 | 13 |
| K - chunks + 2.1% waxy rice starch + 3.68% 5 - D.E. Maltodextrin + 0.26% lecithin | Ad libitum | 0 | 5 | 9 | 25 | 61 |

The results shown in Table X indicate that only thickening system K provided acceptable stool quality. All other thickening systems produced significant watery, loose stools. The formulas of each of the thickening systems are provided in Tables XI–XVI.

TABLE XI

Meat-In-Gravy Pet Food F

| INGREDIENTS | % OF MEAT EMULSION | % OF GRAVY | % OF PRODUCT |
|---|---|---|---|
| Chicken neck | 30.40 | 0 | 14.50 |
| Pork Liver | 23.06 | 0 | 11.00 |
| Beef lungs | 23.06 | 0 | 11.00 |
| Wheat flour | 8.39 | 0 | 4.00 |
| Oat fiber | 6.29 | 0 | 3.00 |
| Plasma | 5.24 | 0 | 2.50 |
| Vitamins | 0.25 | 0 | 0.12 |
| Minerals | 0.80 | 0 | 0.38 |
| Water | 2.51 | 99.00 | 52.98 |
| Guar Gum | — | 1.00 | 0.52 |
| Total | 100.00 | 100.00 | 100.00 |

TABLE XII

Meat-In-Gravy Pet Food G

| INGREDIENTS | % OF MEAT EMULSION | % OF GRAVY | % OF PRODUCT |
|---|---|---|---|
| Chicken neck | 27.39 | 0 | 13.20 |
| Pork liver | 26.97 | 0 | 13.00 |
| Beef lungs | 18.67 | 0 | 9.00 |
| Wheat flour | 8.30 | 0 | 4.00 |
| Oat fiber | 6.22 | 0 | 3.00 |
| Plasma | 4.15 | 0 | 2.00 |
| Vitamins | 0.24 | 0 | 0.11 |
| Minerals | 0.79 | 0 | 0.38 |
| Water | 7.27 | 85.10 | 47.50 |
| Maltodextrin 10 D.E. | 0 | 7.14 | 3.70 |
| Starch | 0 | 2.00 | 1.04 |
| Lecithin | 0 | 0.56 | 0.29 |
| Corn Syrup solids | 0 | 4.83 | 2.59 |
| Xanthan gum | 0 | 0.37 | 0.19 |
| Total | 100.00 | 100.00 | 100.00 |

TABLE XIII

Meat-In-Gravy Pet Food H

| INGREDIENTS | % OF MEAT EMULSION | % OF GRAVY | % OF PRODUCT |
|---|---|---|---|
| Chicken neck | 30.40 | 0 | 14.50 |
| Pork liver | 23.06 | 0 | 11.00 |
| Beef lungs | 23.06 | 0 | 11.00 |
| Wheat flour | 8.39 | 0 | 4.00 |
| Oat fiber | 6.29 | 0 | 3.00 |
| Plasma | 5.24 | 0 | 2.50 |
| Vitamins | 0.25 | 0 | 0.12 |
| Minerals | 0.80 | 0 | 0.38 |
| Water | 2.51 | 99.20 | 53.08 |
| CMC | — | 0.80 | 0.42 |
| Total | 100.00 | 100.00 | 100.00 |

TABLE XIV

Meat-In-Gravy Pet Food I

| INGREDIENTS | % OF MEAT EMULSION | % OF GRAVY | % OF PRODUCT |
|---|---|---|---|
| Chicken neck | 30.40 | 0 | 14.50 |
| Pork liver | 23.06 | 0 | 11.00 |
| Beef lungs | 23.06 | 0 | 11.00 |

TABLE XIV-continued

Meat-In-Gravy Pet Food I

| INGREDIENTS | % OF MEAT EMULSION | % OF GRAVY | % OF PRODUCT |
|---|---|---|---|
| Wheat flour | 8.39 | 0 | 4.00 |
| Oat fiber | 6.25 | 0 | 3.00 |
| Plasma | 5.24 | 0 | 2.50 |
| Vitamins | 0.25 | 0 | 0.12 |
| Minerals | 0.80 | 0 | 0.38 |
| Water | 2.51 | 96.00 | 51.41 |
| Starch, instant waxy maize | — | 4.00 | 2.09 |
| Total | 100.00 | 100.00 | 100.00 |

TABLE XV

Meat-In-Gravy Pet Food J

| INGREDIENTS | % OF MEAT EMULSION | % OF GRAVY | % OF PRODUCT |
|---|---|---|---|
| Chicken neck | 30.40 | 0 | 14.50 |
| Pork liver | 23.06 | 0 | 11.00 |
| Beef lungs | 23.06 | 0 | 11.00 |
| Wheat flour | 8.39 | 0 | 4.00 |
| Oat fiber | 6.29 | 0 | 3.00 |
| Plasma | 5.24 | 0 | 2.50 |
| Vitamins | 0.25 | 0 | 0.12 |
| Minerals | 0.80 | 0 | 0.38 |
| Water | 2.51 | 84.10 | 45.17 |
| Maltodextrin 5 DE | 0 | 10.00 | 5.23 |
| Starch, phosphate cross-linked | 0 | 5.00 | 2.61 |
| Lecithin | 0 | 0.60 | 0.31 |
| CMC | 0 | 0.30 | 0.16 |
| Total | 100.00 | 100.00 | 100.00 |

TABLE XVI

Meat-In-Gravy Pet Food K

| INGREDIENTS | % OF MEAT EMULSION | % OF GRAVY | % OF PRODUCT |
|---|---|---|---|
| Chicken neck | 24.47 | 0 | 14.00 |
| Pork liver | 24.21 | 0 | 11.50 |
| Beef lungs | 23.15 | 0 | 11.00 |
| Wheat flour | 5.68 | 0 | 2.70 |
| Oat fiber | 8.42 | 0 | 4.00 |
| Egg | 4.21 | 0 | 2.00 |
| Plasma | 1.05 | 0 | 0.50 |
| Vitamins | 0.25 | 0 | 0.12 |
| Minerals | 0.86 | 0 | 0.41 |
| Water | 2.70 | 88.50 | 47.73 |
| Maltodextrin 5 DE | — | 7.00 | 3.68 |
| Starch native waxy rice | — | 4.00 | 2.10 |
| Lecithin | — | 0.50 | 0.26 |
| Total | 100.00 | 100.00 | 100.00 |

The composition of invention inhibits the production of unacceptable stool quality when a pet, particularly a dog, is fed a standard "chunk and gravy" diet having modified starch and/or gums therein as the primary, essentially all, or complete daily diet.

What is claimed is:

1. A method of substantially increasing stool quality in a pet which has experienced unacceptable stool quality after ingesting primarily a meat chunk and gravy diet having unacceptable stool quality inducing quantities of a chemically modified starch, gum or mixtures therein comprising feeding said pet a meat chunk and gravy diet having zero to less than the quantity of chemically modified starch, gum or mixture thereof necessary to bring about unacceptable stool quality.

2. The method in accordance with claim 1 wherein the pet is a canine.

3. The method in accordance with claim 2 wherein the canine pet food has zero to about 0.2 wt. % of a chemically modified starch, gum or mixture thereof.

4. The method in accordance with claim 3 wherein the canine pet food has zero to about 0.1 wt. % of a chemically modified starch, gum or mixture thereof.

5. The method in accordance with claim 4 wherein the canine pet food has no chemically modified starch, gum or mixture thereof.

* * * * *